United States Patent
Wang et al.

(10) Patent No.: US 12,418,610 B2
(45) Date of Patent: Sep. 16, 2025

(54) DEVICE SWITCHING METHOD FOR DISPLAY APPARATUS AND DISPLAY APPARATUS

(71) Applicant: HISENSE VISUAL TECHNOLOGY CO., LTD., Shandong (CN)

(72) Inventors: Qiang Wang, Shandong (CN); Jie Dong, Shandong (CN); Hui Jiang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 473 days.

(21) Appl. No.: 18/067,242

(22) Filed: Dec. 16, 2022

(65) Prior Publication Data

US 2023/0120103 A1  Apr. 20, 2023

Related U.S. Application Data

(63) Continuation of application No. PCT/CN2021/119575, filed on Sep. 22, 2021.

(30) Foreign Application Priority Data

Oct. 14, 2020 (CN) .......................... 202011096665.9
Jul. 13, 2021 (CN) .......................... 202110791222.X

(51) Int. Cl.
*H04M 1/72409* (2021.01)
(52) U.S. Cl.
CPC .............................. *H04M 1/72409* (2021.01)

(58) Field of Classification Search
CPC ......... H04M 1/72409; H04M 1/72412; H04M 2250/02; G06F 3/16; H04N 21/422; H04N 21/431; H04N 21/488; H04W 4/80
See application file for complete search history.

(56) References Cited

FOREIGN PATENT DOCUMENTS

| CN | 101340212 A | 1/2009 |
|---|---|---|
| CN | 103578246 A | 2/2014 |
| CN | 106055300 A | 10/2016 |
| CN | 106131971 A | 11/2016 |

(Continued)

OTHER PUBLICATIONS

International Search Report, mailed Dec. 22, 2021, from PCT/CN2021/119575.

(Continued)

*Primary Examiner* — Farid Seyedvosoghi
(74) *Attorney, Agent, or Firm* — Workman Nydegger

(57) ABSTRACT

Disclosed are a device switching method for a display apparatus and a display apparatus. The method includes: recognizing a first class of device of a Bluetooth device, and presenting the first class of device in a first user interface; in response to a device switch command being received within a specified time from outside, determining that the first class of device is different from an actual second class of device, updating the first class of device in the first user interface to the second class of device, and interacting with the Bluetooth device according to the second class of device; and in response to no device switch command being received within the specified time input from outside, determining that the first class of device is the same as the actual second class of device, and interacting with the Bluetooth device according to the second class of device.

18 Claims, 12 Drawing Sheets

(56) References Cited

FOREIGN PATENT DOCUMENTS

| CN | 107864432 A | | 3/2018 | | |
|---|---|---|---|---|---|
| CN | 109495871 A | | 3/2019 | | |
| CN | 109901478 A | | 6/2019 | | |
| CN | 305307578 S | | 8/2019 | | |
| CN | 110662097 A | | 1/2020 | | |
| CN | 110784846 A | | 2/2020 | | |
| CN | 110784858 A | | 2/2020 | | |
| CN | 111050198 A | | 4/2020 | | |
| CN | 111127861 A | | 5/2020 | | |
| CN | 111246441 A | | 6/2020 | | |
| CN | 111542031 A | * | 8/2020 | ............. | H04W 4/80 |
| CN | 111596881 A | | 8/2020 | | |
| CN | 111885556 A | * | 11/2020 | ............ | G08C 17/02 |
| CN | 112272373 A | | 1/2021 | | |
| CN | 112911380 A | | 6/2021 | | |
| JP | 4980755 B2 | | 7/2012 | | |
| JP | 2016092799 A | | 5/2016 | | |
| WO | 2019218548 A1 | | 11/2019 | | |

OTHER PUBLICATIONS

Chinese First Office Action, mailed Mar. 3, 2022, from Chinese App. No. 202110791222.X.
Chinese Second Office Action, mailed Oct. 8, 2022, from Chinese App. No. 202110791222.X.
Instructions for Hisense Smart TV Remote Controller, Apr. 9, 2019, https://jingyan.baidu.com/article/2d5afd691e566085a2e28eef.html.

* cited by examiner

| Sound | | |
|---|---|---|
| 🖼 | Sound Mode Standard | > |
| 🔊 | Dolby Atmos | ▫ |
| 🌐 | Headphone | > |
| 🚫 | Sound Mode Settings | > |
| ⚤ | Speakers | > |
| | | |

FIG. 8

| Audio Output | | |
|---|---|---|
| 🖼 | BT Sound Bar | ✓ |
| 🔊 | ARC | |
| 🌐 | TV Speaker | |
| 🚫 | SPDIF Only | |
| ⚤ | | |
| | | |

FIG. 9

DEVICE SWITCHING METHOD FOR DISPLAY APPARATUS AND DISPLAY APPARATUS

CROSS REFERENCE TO RELATED APPLICATIONS

This application is a continuation application of International Application No. PCT/CN2021/119575, filed on Sep. 22, 2021, which claims priorities to Chinese Patent Application No. 202011096665.9 filed on Oct. 14, 2020, and Chinese Patent Application No. 202110791222.X filed on Jul. 13, 2021. The entire contents of these applications are incorporated herein by reference.

FIELD

The present disclosure relates to the field of internet, and particularly relates to a device switching method for a display apparatus and a display apparatus.

BACKGROUND

The display apparatus, such as television, plays an important role in people's home life, and can be used to watch the live Audio and Video (AV) programs from some TV stations and the Video on Demand (VOD) programs on the Internet. The display apparatus may connect with different types of external devices, like Bluetooth devices.

Generally, an electronic device identifies a class of Bluetooth device according to a Class of Device (Cod) of a Bluetooth device.

SUMMARY

The embodiments of the present disclosure provide a display apparatus. The display apparatus includes: a display, configured for presenting one or more images obtained from a broadcast system and/or network, and/or, a user interface, and capable of communicating with a remote control according to infrared protocols or bluetooth protocols, where the remote control includes one or more keys; a communicator, configured for communicating with one or more external devices according to bluetooth protocols; and a controller, in connection with the display and the communicator, and configured to: recognize a first class of device of a bluetooth device currently in connection with the display apparatus, and present the first class of device in a first user interface of the display; in response to a device switch command being received within a specified time from outside, determine that the first class of device is different from an actual second class of device of the bluetooth device currently in connection with the display apparatus, update the first class of device in the first user interface of the display to the second class of device, and interact with the bluetooth device according to the second class of device, where the device switch command is generated in a scenario where the first class of device is different from the actual second class of device of the bluetooth device currently in connection with the display apparatus; and in response to no device switch command being received within the specified time from outside, determine that the first class of device is the same as the actual second class of device, and interact with the bluetooth device according to the second class of device.

The embodiments of the present application provides a device switching method for a display apparatus, including: recognizing a first class of device of a bluetooth device currently in connection with the display apparatus, wherein the display apparatus includes a communicator configured for communicating with one or more external devices according to bluetooth protocols; presenting the first class of device in a first user interface of a display of the display apparatus; in response to a device switch command being received within a specified time from outside, determining that the first class of device is different from an actual second class of device of the bluetooth device currently in connection with the display apparatus, updating the first class of device in the first user interface of the display to the second class of device, and interacting with the bluetooth device according to the second class of device, wherein the device switch command is generated in a scenario where the first class of device is different from the actual second class of device of the bluetooth device currently in connection with the display apparatus; and in response to no device switch command being received within the specified time input from outside, determining that the first class of device is the same as the actual second class of device, and interacting with the bluetooth device according to the second class of device.

BRIEF DESCRIPTION OF THE DRAWINGS

FIG. 8 is a schematic diagram of a Sound interface in a scenario where a class of Bluetooth device is a Bluetooth speaker according to an embodiment of the present disclosure.

FIG. 9 is a schematic diagram of an Audio Output interface in a scenario where a class of Bluetooth device is a Bluetooth speaker according to an embodiment of the present disclosure.

DETAILED DESCRIPTION OF THE EMBODIMENTS

In order to make the objectives, schemes and advantages of the present disclosure clearer, the illustrative embodiments of the present disclosure will be described clearly and completely below in combination with the accompanying drawings in the illustrative embodiments of the present disclosure. Obviously, the illustrative embodiments described are some rather than all of the embodiments of the present disclosure.

On the basis of the illustrative embodiments of the present disclosure, all other embodiments obtained by those of ordinary skill in the art without making creative efforts fall within the scope of protection of the present disclosure. In addition, although the disclosed contents of the present disclosure are discussed according to one or more illustrative examples, it should be understood that the various aspects of the disclosed contents may each constitute a complete implementation.

It should be noted that the brief description of the terms in the present disclosure is only for ease of understanding of the implementations described below, and is not intended to limit the implementations of the present disclosure. Unless otherwise indicated, these terms should be understood according to their plain and ordinary meanings.

For ease of understanding the embodiments in the present disclosure, a structure of a display apparatus, and an interaction process of the display apparatus and a control device are first described below.

Figure 1A:
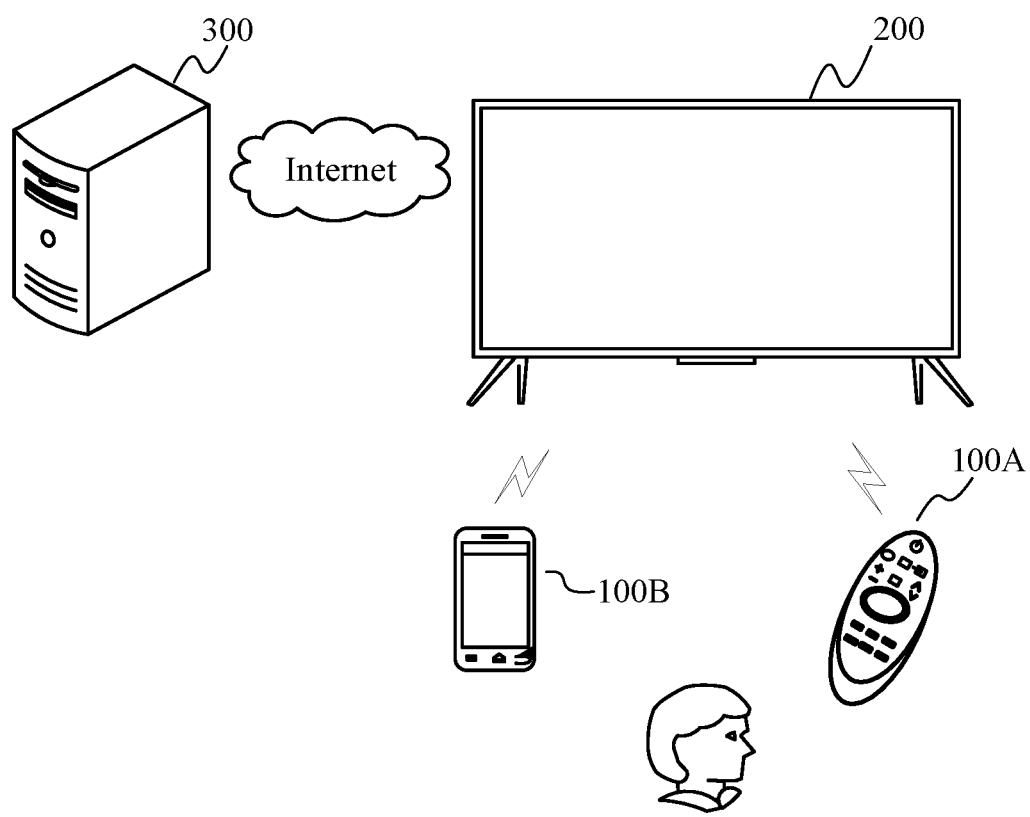
FIG. 1A shows a schematic diagram of an operation scenario between a display apparatus 200 and a control device 100.

FIG. 1A illustrates a schematic diagram of an operation scenario between a display apparatus 200 and a control device 100. As shown in FIG. 1A, communication between the control device 100 and the display apparatus 200 may be performed in a wired or wireless manner.

The control device 100 is configured to control the display apparatus 200, and may receive commands input from a user, and convert the commands into instructions which can be recognized and responded by the display apparatus 200, and acts as an intermediary for interaction between the user and the display apparatus 200. For example, when a user operates channel up and down keys on the control device 100, the display apparatus 200 will respond with channel up and down operations.

The control device 100 may be a remote control 100A, including infrared communication protocol or Bluetooth® communication protocol, and other short range communication protocol, to control the display apparatus 200 via wireless or other wired mode. A user may input user commands through keys, voice input, control panel input, and the like on a remote control, to control the display apparatus 200.

The control device 100 may be a smart device, such as a mobile terminal 100B, a tablet computer, a computer and a notebook computer.

For example, applications may be installed on the mobile terminal 100B and the display apparatus 200, so as to realize communication according to a network communication protocol for the purpose of one-to-one control operation and data communication. For example, a control instruction protocol may be established between the mobile terminal 100B and the display apparatus 200 to achieve functions of physical keys arranged on the remote control 100A by operating various function keys or virtual buttons on a user interface provided by the mobile terminal 100B. Audio and video contents displayed on the mobile terminal 100B may be cast onto the display apparatus 200 for synchronous display.

The display apparatus 200 may be in data communication with a server 300 through various communication manners.

Figure 1B:
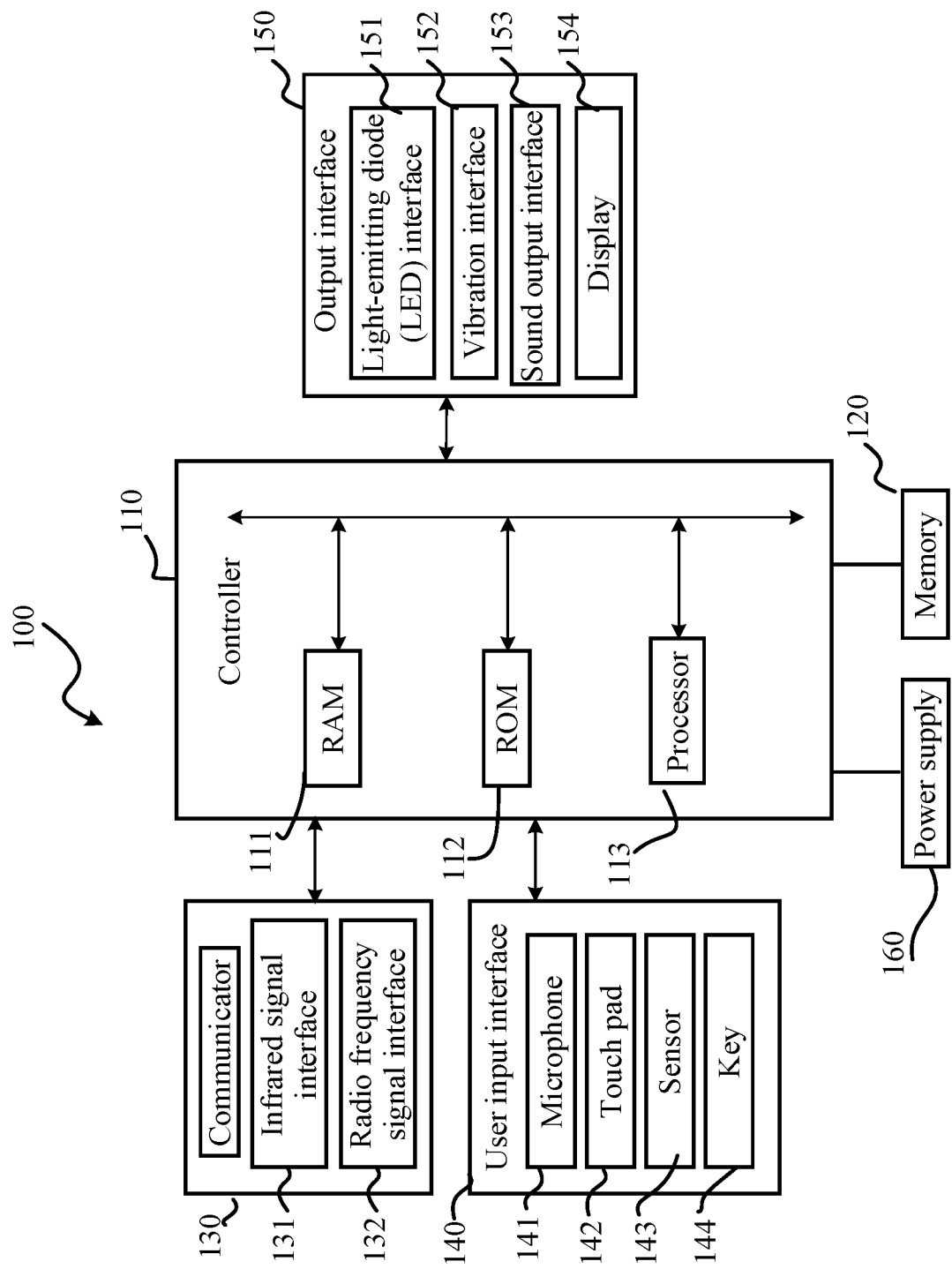
FIG. 1B shows a block diagram of a configuration of the control device 100 in FIG. 1A.

FIG. 1B illustrates a block diagram of a configuration of the control device 100. As shown in FIG. 1B, the control device 100 includes a controller 110, a memory 120, a communicator 130, a user input interface 140, an output interface 150 and a power supply 160.

The controller 110 includes a random access memory (RAM) 111, a read only memory (ROM) 112, a processor 113, a communication interface and a communication bus. The controller 110 is configured for controlling running and operations of the control device 100, communication cooperation between various internal components, and external and internal data processing.

For example, when an interaction that a user presses a key arranged on the remote control 100A or an interaction that a user touches a touch panel arranged on the remote control 100A is detected, the controller 110 may control to generate a signal corresponding to the detected interaction, and transmit the signal to the display apparatus 200.

The memory 120 is configured for storing various running programs, data and applications for driving and controlling the control device 100 under the control of the controller 110. The memory 120 may store various control signal instructions input from a user.

The communicator 130 realizes communication of control signals and data signals with the display apparatus 200 under the control of the controller 110. For example, the control device 100 transmits a control signal (such as a touch signal or a key signal) to the display apparatus 200 by the communicator 130, and the control device 100 may receive a signal transmitted from the display apparatus 200 by the communicator 130. The communicator 130 may include an infrared signal interface 131 and a radio frequency signal interface 132. For example, an infrared signal interface may be configured to convert a user input command into an infrared control signal according to an infrared control protocol, which may be transmitted to the display apparatus 200 by an infrared transmitting module. For another example, a radio frequency signal interface may be configured to convert a user input instruction into a digital signal, and then modulate the digital signal according to a radio frequency signal modulation protocol and then sent the signal to the display apparatus 200 via a radio frequency transmission module.

The user input interface 140 may include at least one of a microphone 141, a touch pad 142, a sensor 143, a key 144, etc., such that a user may input a user command for controlling the display apparatus 200 to the control device 100 through voice, touch, a gesture, press, etc.

The output interface 150 outputs a user command received through the user input interface 140 to the display apparatus 200, or outputs an image or voice signal from the display apparatus 200. Here, the output interface 150 may include a light emitting diode (LED) interface 151, a vibration interface 152 that generates vibration, a sound output interface 153 that outputs sound, a display 154 that outputs images, etc. For example, the remote control 100A may receive audio, video or data and other output signals from the output interface 150, and display the output signals on the display 154 in an image form, output signals via the sound output interface 153 in an audio form, or output signals at the vibration interface 152 in a vibration form.

The power supply 160 is configured for providing power support for components of the control device 100 under the control of the controller 110 in a battery and an associated control circuit form.

Figure 1C:
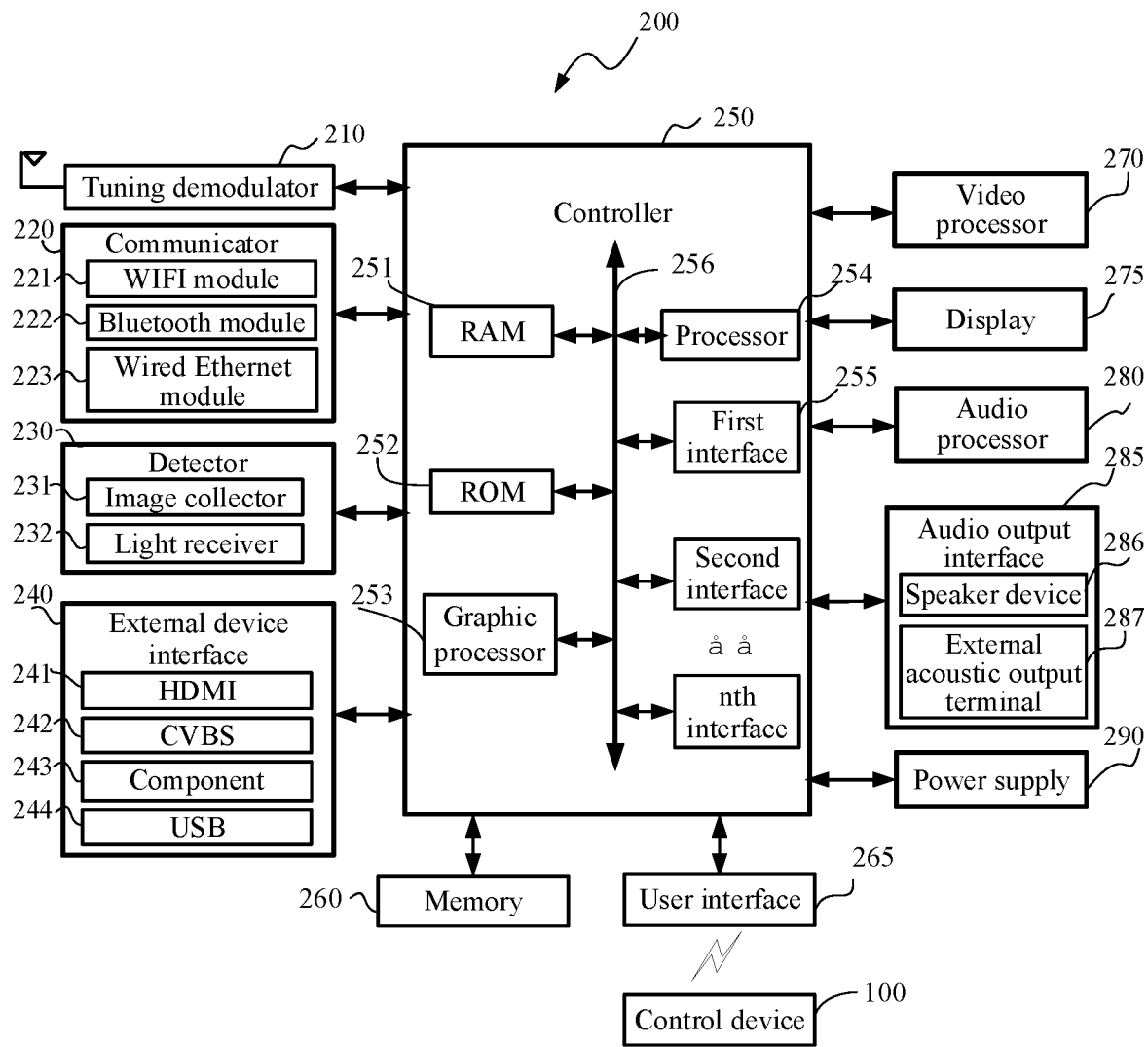
FIG. 1C shows a block diagram of a configuration of the display apparatus 200 in FIG. 1A.

FIG. 1C illustrates a block diagram of a configuration of the display apparatus 200. As shown in FIG. 1C, the display apparatus 200 may further include a tuning demodulator 210, a communicator 220, a detector 230, an external device interface 240, a controller 250, a memory 260, a user interface 265, a video processor 270, a display 275, an audio processor 280, an audio output interface 285 and a power supply 290.

The tuning demodulator 210 receives broadcast television signals in a wired or wireless manner, and perform modulation-demodulation processing such as amplification, frequency mixing and resonance, and is configured to demodulate audio and video signals carried in a frequency of a television channel selected by a user, and additional information (for example, electronic program guide (EPG) data) from multiple wireless or wired broadcast television signals.

The tuning demodulator 210 may respond, according to user selection and under the control of the controller 250, to the frequency of the television channel selected by the user and the television signals carried in the frequency.

The tuning demodulator 210 may receive, according to different broadcast systems of television signals, signals in various ways, such as terrestrial broadcast, wired broadcast, satellite broadcast, or internet broadcast; may use a digital modulation mode or an analog modulation mode according to different modulation types; and may demodulate analog signals and digital signals according to different television signal types received.

In some other illustrative embodiments, the tuning demodulator 210 may be in an external device, for example, an external set top box. In this way, the set top box outputs television signals after modulation and demodulation to input the signals to the display apparatus 200 through the external device interface 240.

The communicator 220 is a component for communicating with an external device or an external server according to various communication protocols. For example, the display apparatus 200 may transmit content data to an external device connected via the communicator 220, or browse and download content data from an external device connected via the communicator 220. The communicator 220 may include a WIFI module 221, a Bluetooth communication protocol module 222, a wired Ethernet module 223 and other network communication protocol modules or a near field communication protocol module such that the communicator 220 may receive a control signal of the control device 100 under the control of the controller 250, and implement the control signal as a WIFI signal, a bluetooth signal, a radio frequency signal, etc.

The detector 230 is a component for the display apparatus 200 to collect signals from external environment or signals for interaction from outside. The detector 230 may include an image collector 231, for example, a camera for collecting external environment scenes, so as to adaptively change display parameters of the display apparatus 200; and for collecting attributes from a user or gestures for interacting with a user, so as to implement interaction between the display apparatus and the user. The detector may further include a light receiver 232 for collecting environment light intensity, so as to adapt to changes in display parameters of the display apparatus 200, etc.

In some other illustrative embodiments, the detector 230 may further include a temperature sensor. For example, by sensing and measuring an environment temperature, the display apparatus 200 may adaptively adjust a display color temperature of a picture. The detector 230 may further include a sound collector, for example, a microphone for receiving voice data from a user.

The external device interface 240 is a component for the controller 250 to control data transmission between the display apparatus 200 and an external device. The external device interface 240 may be connected with an external device, such as a set top box, a game device and a notebook computer in a wired or wireless manner, and may receive a video signal (such as a motion image), an audio signal (such as music), additional information (such as EPG), and other data from the external devices.

The external device interface 240 may include any one or more of a high definition multimedia interface (HDMI) 241, a composite video blanking sync (CVBS) interface 242, an analog or digital component interface 243, a universal serial bus (USB) interface 244, a component interface (not shown), and a red-green-blue (RGB) interface (not shown).

The controller 250 controls and responds to user operations for the display apparatus 200 by running various software programs (for example, an operating system and various applications) stored in the memory 260.

As shown in FIG. 1C, the controller 250 includes a random access memory (RAM) 251, a read only memory (ROM) 252, a graphics processing unit 253, a processor (such as CPU) 254, a communication interface 255, and a communication bus 256. The RAM 251, the ROM 252, the graphic processing unit 253, the processor 254 and the communication interface 255 are connected with each other by the communication bus 256.

The ROM 252 is used for storing various system startup instructions. The display apparatus 200 is started when a power signal is received, the processor 254 runs the system initialization instructions in the ROM 252, copies the operating system stored in the memory 260 to the RAM 251 to start running the operating system. When the operating system initialization is completed, the processor 254 then copies the various applications in the memory 260 in the RAM 251, and then begins to start the various applications.

The graphics processor 253 is configured to generate various graphic objects, such as an icon, an image, and an operation menu. The graphics processor 253 may include an operator, configured to perform computation by receiving various interactive commands from the user and then display various objects according to display properties; and include a renderer, configured to generate the various objects obtained based on the operator and display a rendered result on the display 275.

The CPU 254 is used for running the operating system and application instructions stored in memory 260; and executing various applications and processing data and contents according to the user input instruction, so as to display and play various audio and video contents.

In some illustrative embodiments, the processor 254 may include multiple processors. The multiple processors may include a main processor and one or more sub-processors. The main processor is used for running some initialization operations of the display apparatus 200 in a pre-loading mode of the display apparatus, and/or an operation of displaying an image in a normal mode. The one or more sub-processors are used for performing operations in a standby mode, etc. of the display apparatus.

The communication interface 255 may include the first to $n^{th}$ interfaces. These interfaces may be network interfaces for connecting with an external device through networks.

The controller 250 may control overall operation of the display apparatus 200. For example, in response to receiving a command for selecting a graphical user interface (GUI) object presented on the display 275 from a user, the controller 250 may perform operations related to the object selected by the command from the user.

The object may be any one of objects available for selection, for example, a hyperlink or an icon. The operations related to the selected object include, for example, an operation of displaying a link to hyperlink pages, documents and images, or an operation of launching an application corresponding to an icon. The command for selecting a GUI object from a user may be a command input by various input devices (such as a mouse, a keyboard and a touch pad) connected with the display apparatus 200, or a voice command corresponding to a voice uttered by a user.

The memory 260 is configured for storing various types of data, software programs or applications for driving and controlling running of the display apparatus 200. The memory 260 may include a volatile and/or non-volatile memory. The term "memory" includes the memory 260, the RAM 251 and the ROM 252 of the controller 250, or a memory card in the display apparatus 200.

In some embodiments, the memory 260 is specifically used for storing running programs for driving the controller 250 of the display apparatus 200; storing various applications built in the display apparatus 200 and downloaded by a user from an external device; and storing visual effect images for configuring various GUIs provided by the display 275, various objects related to the GUIs, and a selector for selecting a GUI object, and other data.

In some embodiments, the memory 260 is specifically used for storing drive programs and related data of the modem 210, the communicator 220, the detector 230, the external device interface 240, the video processor 270, the display 275, the audio processor 280, etc., external data (such as audio and video data) received from the external device interface, or user data (such as key information, voice information and touch information) received from the user port.

In some embodiments, the memory 260 specifically stores software and/or programs representing an operating system (OS), which may include, for example, a kernel, middleware, application programming interfaces (APIs), and/or applications. For example, the kernel may control or manage system resources, as well as functions implemented by other programs (such as the middleware, APIs or applications). Moreover, the kernel may provide interfaces to allow middleware, APIs or applications to access the controller, so as to control or manage system resources.

Figure 1D:
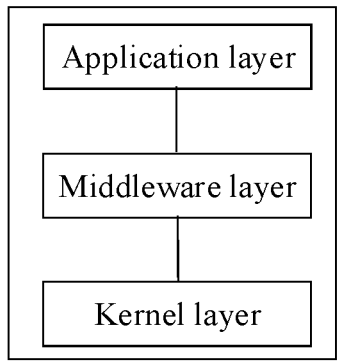
FIG. 1D shows a block diagram of an architectural configuration of an operating system in a memory of the display apparatus 200.

FIG. 1D illustrates a block diagram of an architectural configuration of an operating system in a memory of the display apparatus 200. An architecture of the operating system includes an application layer, a middleware layer and a kernel layer from top to bottom.

Applications built in the system and non-system-level applications all belong to the application layer, and the application layer is responsible for directly interacting with a user. The application layer may include a plurality of applications such as a video application, a setting application and a media center application. These applications may be implemented as Web applications, which are executed on the basis of a WebKit engine, and specifically may be developed and executed on the basis of hypertext markup language (HTML), cascading style sheets (CSS) and JavaScript.

The middleware layer may provide some standard interfaces, so as to support operations in various environments and systems. For example, the middleware layer may be implemented as multimedia and hypermedia information coding expert group (MHEG) of middleware related to broadcast data, digital living network alliance (DLNA) middleware of middleware related to communication with an external device, middleware providing a browser environment in which applications on the display apparatus are run, etc.

The kernel layer provides core system services, such as file management, memory management, process management, network management, and system security authority management. The kernel layer may be implemented as a kernel based on various operating systems, for example, a kernel based on a Linux operating system.

The kernel layer further provides communication between system software and hardware, and provides device drive services for various hardware, for example, provides a drive program for a panel, a camera drive program for a camera, a key drive program for a remote control, a WiFi drive program for a WIFI module, an audio drive program for an audio output interface, a power management drive for a power management (PM) module, etc.

The user interface 265 receives various user interactions. Specifically, the user interface is used for transmitting an input signal from a user to the controller 250, or transmitting an output signal from the controller 250 to a user. For example, the remote control 100A may transmit a power up signal, a channel selection signal, a volume adjustment signal and other input signals from a user to the user interface 265, and then the user interface 265 transmits the input signal to the controller 250; or the remote control 100A may receive audio, video or data and other output signals from the user interface 265 processed by the controller 250, and display the output signal or output the output signal in an audio or vibration form.

In some embodiments, a user may input a command for a graphical user interface (GUI) presented on the display 275, and the user interface 265 receives the command through the GUI. In particular, the user interface 265 may receive a command for controlling a position of a selector on the GUI, so as to select a different object or item.

Alternatively, a user may input a command by inputting a specific sound or gesture, and then the user interface 265 recognizes the sound or gesture through a sensor, so as to receive the command from the user.

The video processor 270 is configured to receive an external video signal, and perform video data processing such as decompression, decoding, scaling, noise reduction, frame rate conversion, resolution conversion and image synthesis according to a standard encoding and decoding protocol of the input signal so as to obtain the video signal which can be directly displayed or played on the display 275.

For example, the video processor 270 includes a demultiplexing module, a video decoding module, an image synthesis module, a frame rate conversion module, a display formatting module, etc.

The demultiplexing module is used for demultiplexing input audio and video data streams, for example, the demultiplexing module demultiplexes an input moving picture experts group (MPEG)-2 stream (on the basis of the compression standard of digital storage media moving picture and voice) into a video signal, an audio signal, etc.

The video decoding module is used for processing the demultiplexed video signal, for example, decoding and scaling the demultiplexed video signal, etc.

The image synthesis module, for example, an image synthesizer, is used for superimposing and mixing a GUI signal from a user or generated by a graphic generator with a scaled video image, so as to generate an image signal for display.

The frame rate conversion module is used for converting a frame rate of an input video, for example, converting a frame rate of an input video of 60 Hz into a frame rate of 120 Hz or 240 Hz, and a common format is implemented through, for example, frame interpolation.

The display formatting module is used for converting a signal output from the frame rate conversion module into a signal conforming to a display format of the display, for example, carrying out format conversion on the signal output from the frame rate conversion module so as to output a red-green-blue (RGB) data signal.

The display 275 is used for receiving an image signal output from the video processor 270, and displaying a video, an image and a menu control interface. For example, the display may display a video from a broadcast signal received by the tuning demodulator 210, a video input from the communicator 220 or the external device interface 240, or an image stored in the memory 260. The display 275 simultaneously displays a user interface (UI) generated in the display apparatus 200 and used for controlling the display apparatus 200.

Moreover, the display 275 may include a panel component for presenting an image and a driving component for driving image display; or if the display 275 is a projection display, the display may further include a projection device and a projection screen.

The audio processor 280 is used for receiving an external audio signal, carrying out decompression, decoding, noise reduction, digital-to-analog conversion, amplification and other audio data processing according to a standard encoding and decoding protocol of an input signal, so as to obtain an audio signal that can be played in the Speaker device 286.

For example, the audio processor 280 may support various audio formats, for example, MPEG-2, MPEG-4, advance audio coding (AAC) and high efficiency AAC (HE-AAC).

The audio output interface 285 is used for receiving audio signals output from the audio processor 280. For example, the audio output interface may output audio from broadcast signals via the tuning demodulator 210, audio via the communicator 220 or the external device interface 240, and audio stored in the memory 260. The audio output interface 285 may include the Speaker device 286, or an external acoustic output terminal 287 for outputting to a sound device of an external device, for example, an earphone output terminal.

In some other illustrative embodiments, the video processor 270 may include one or more chips. The audio processor 280 may also include one or more chips.

Moreover, in some other illustrative embodiments, the video processor 270 and the audio processor 280 may be separate chips or may be integrated in one or more chips with the controller 250.

The power supply 290 is configured for providing, by means of power input from an external power supply, power supply support for the display apparatus 200 under the control of the controller 250. The power supply 290 may be a built-in power supply circuit arranged in the display apparatus 200, or may be a power supply arranged outside the display apparatus 200.

The display apparatus in embodiments of the present disclosure are discussed above, and for ease of understanding, a scenario in an embodiment of the present disclosure will be first discussed.

When the display apparatus is connected with a Bluetooth device such as a BT headphone or a BT speaker, a class of Bluetooth device identified by the display apparatus may not match with an actual class of the Bluetooth device in connection with the display apparatus, for example, a class of the Bluetooth speaker in connection with the display apparatus is identified by the display apparatus as a Bluetooth headphone, but interactions between different Bluetooth devices and the display apparatus are different, for example, the Bluetooth headphone has the following characteristics.

After the Bluetooth headphone is connected with the display apparatus, only a wearer of the Bluetooth headphone can receive a sound. When other speaker output devices output sounds from the display apparatus, sound output of the Bluetooth headphone may not be interfered, such that a sound output behavior of the Bluetooth headphone is independent from a sound output behavior of other speakers in connection with the display apparatus. That is to say, if the display apparatus is connected with the Bluetooth headphone, the Bluetooth headphone may not be stopped from outputting a sound by switching to other speaker output devices. Therefore, an interaction mode between the Bluetooth headphone and other speaker output devices is: when the display apparatus outputs sound, the sound may be output to the Bluetooth headphone and other speaker output devices simultaneously, or may only be output to the Bluetooth headphone. Other speaker output devices herein include Audio Return Channel (ARC), Speaker, Sony/Philips Digital Interface (Spdif), and other speaker output devices configured in the display apparatus, and external speaker output devices connected to the display apparatus, which are only exemplary for ease of understanding and are not limitative.

The characteristics of the Bluetooth speaker are completely different from those of the Bluetooth headphone: since the Bluetooth speaker publicly outputs a sound, when other speaker output devices output sounds, sound output of the Bluetooth speaker will be interfered. That is to say, only one of the Bluetooth speaker and other speaker output devices may output a sound at the same time. If the Bluetooth speaker is switched to other speaker output devices when the Bluetooth speaker performs sound output, the Bluetooth speaker will be muted and does not output any sound. Therefore, an interaction mode between the Bluetooth speaker and other speaker output devices is: when the display apparatus performs sound output, the sound may only be output to the Bluetooth speaker, or the sound may only be output to one of the other speaker output devices.

In this way, if the display apparatus incorrectly identifies the actual class of the Bluetooth device in connection with the display apparatus, the Bluetooth device in connection with the display apparatus may not perform sound output consistent with characteristics of the class of such Bluetooth device.

Figure 2:
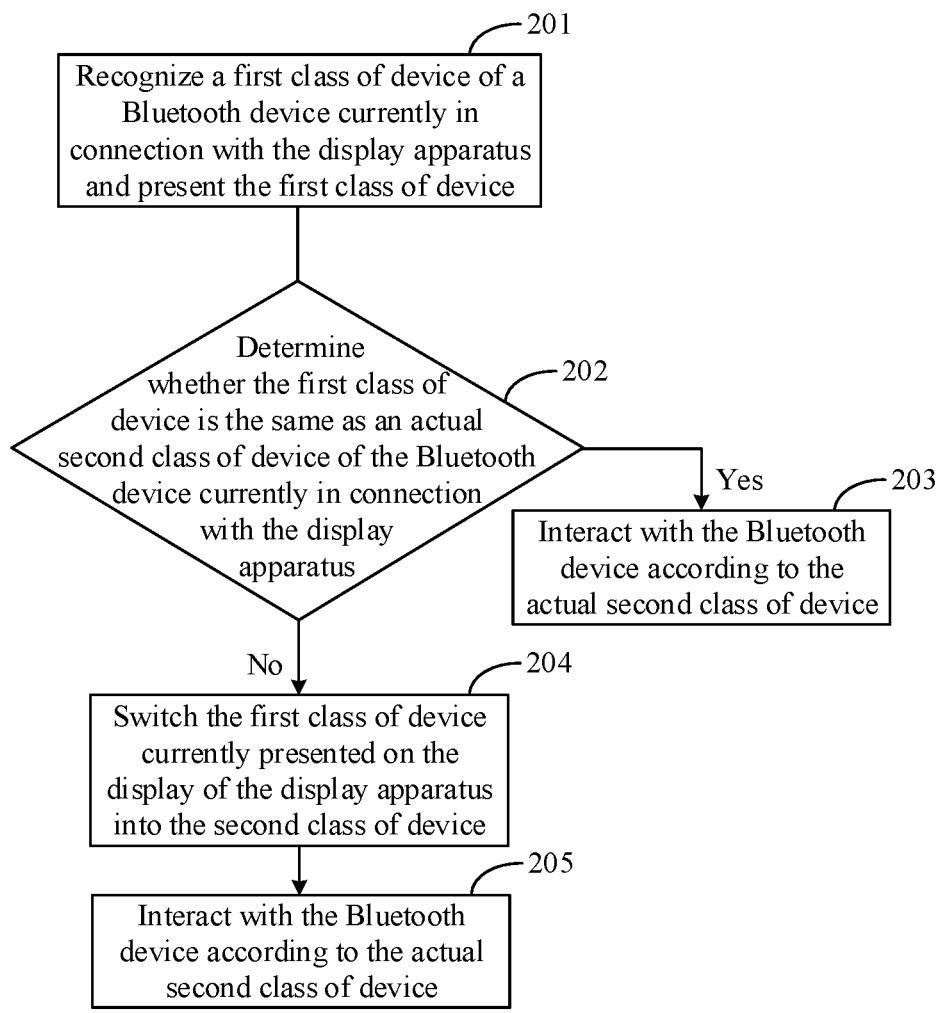
FIG. 2 is a flow diagram of a method according to an embodiment of the present disclosure.

An application scenario of an embodiment of the present disclosure, and the following is a method embodiment in the present disclosure. With reference to FIG. 2, a flow diagram of a method according to an embodiment of the present disclosure is shown in FIG. 2. As an embodiment, a flow shown in FIG. 2 may be applied to a display apparatus discussed above. The display apparatus herein includes a television, a computer, and other electronic devices, which are not specifically limited in the embodiments of the present disclosure.

As shown in FIG. 2, the flow may include the following steps.

Step 201, recognize a first class of device of a Bluetooth device currently in connection with the display apparatus and present the first class of device.

In embodiments, when a display apparatus is connected with a Bluetooth device, a Cod (Class of device) written into the Bluetooth device will be scanned and parsed, where the Cod is set by a Bluetooth device manufacturer before the Bluetooth device leaves a factory and is used for indicating a class of Bluetooth device, and the display apparatus will determine the class of Bluetooth device indicated by the Cod as a class of the Bluetooth device currently connected (denoted as the first class of device).

Optionally, Cod specification is defined by the Bluetooth Special Interest Group, and the Cod includes Reserved for Service Classes, Major Device Classes, and Minor Device Class. The Major Device Classes and the Minor Device Class are used for identifying a class of Bluetooth device. The Reserved for Service Classes is used for defining a service class that the Bluetooth device intends to associate with an application of the display apparatus. The display apparatus may identify that the class of Bluetooth device is the first class of device by reading Major Device Class, Minor Device Class in Cod of the connected Bluetooth device.

Figure 3:
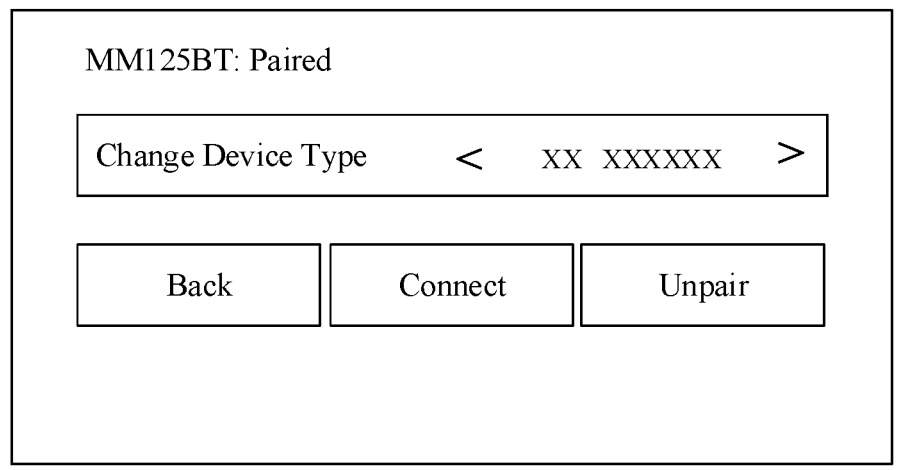
FIG. 3 is a schematic diagram of an interface presenting a class of Bluetooth device according to an embodiment of the present disclosure.

Optionally, the first class of device may be presented in an "xx xxxxxx" area of an interface as shown in FIG. 3.

Step 202: determine whether the first class of device is the same as an actual second class of device of the Bluetooth device currently in connection with the display apparatus, if yes, the flow goes to step 203, and if not, the flow goes to steps 204 and 205.

In some embodiments, whether the first class of device is the same as the second class of device of the Bluetooth device currently in connection with the display apparatus may be determined through the following method.

In response to a device switch command being received within a specified time from outside, determine that the first class of device is different from the actual second class of device of the Bluetooth device currently in connection with the display apparatus. The specified time may be set by a user, or may be a time configured when the display apparatus leaves a factory. The device switch command input from outside is a device switch command input from a user when a user views, by means of the display apparatus, that the first class of device recognized by the display apparatus different from an actual class of device of the Bluetooth device (denoted as the second class of device). For example, when the user views that the first class of device identified by the display apparatus is a BT headphone, but the actual second class of device of this Bluetooth device is a BT speaker, the user inputs a device switch command for switching the BT headphone recognized by the display apparatus to the BT speaker.

In response to a device switch command being not received within a specified time input from outside, determine that the first class of device is the same as the actual second class of device of the Bluetooth device currently in connection with the display apparatus; or in response to a command for indicating that the first class of device being consistent with the second class of device of the Bluetooth device currently in connection with the display apparatus input from outside, determine that the first class of device is the same as a second class of device of the Bluetooth device currently in connection with the display apparatus. In the embodiments, the command for indicating that the first class of device is consistent with the second class of device of the Bluetooth device currently connected may be an instruction for confirming use of the Bluetooth device from a user when the user views, by means of the display apparatus, that the first class of device recognized by the display apparatus is the same as an actual class of device (denoted as the second class of device) of the Bluetooth device. As shown in FIG. 3, it is determined that the first class of device is consistent with the second class of device of the currently connected Bluetooth device by clicking, by a user, a Connect button on an interface of the display apparatus presenting a class of Bluetooth device.

Step 203: interact with the Bluetooth device according to the actual second class of device.

In a scenario where the first class of device is a class for indicating a BT headphone and a second class of device is a class for indicating a BT headphone, the first class of device is consistent with the second class of device, an interaction with the currently connected Bluetooth device is performed according to the class of device of the Bluetooth headphone, and a specific interaction process will be described in detail in the following description of an interaction between the Bluetooth headphone and the display apparatus.

Step 204: switch the first class of device currently presented on the display of the display apparatus into the second class of device.

In embodiments, when a device switch command input from outside is received within a specified time, the first class of device of the Bluetooth device recognized by the display apparatus is switched into the second class of device. When the first class of device is a class for indicating a BT headphone and the second class of device is used for indicating the BT Speaker, the user may click a "Change Device Type" option on an interface as shown in FIG. 3 by means of a remote control or a touch screen within a specified time, and select a "BT Speaker" option in the menu pop up, so as to switch the first class of device "BT Headphone" currently presented on the interface of the display into the second class of device "BT Speaker".

Step 205: interact with the Bluetooth device according to the actual second class of device.

Herein, when the second class of device is a class for indicating a BT speaker. After the first class of device "BT headphone" presented on the interface of the display apparatus is switched to the second class of device "BT speaker"

in step 204, the display apparatus may interact with the Bluetooth device in a mode corresponding to the characteristics of the second class of device "BT speaker", and a specific interaction process will be described in detail in the following description of an interaction between the Bluetooth speaker and the display apparatus.

Until this, the flow shown in FIG. 2 ends.

In an embodiment of the present disclosure, through the flow shown in FIG. 2, if it is identified that the device class of the currently connected Bluetooth device (denoted as the first class of device) is inconsistent with the actual class of device of the currently connected Bluetooth device (denoted as the second class of device), the first class of device may be switched into the second class of device for presentation on the interface of the display apparatus, and an interaction is performed with the currently connected actual Bluetooth device according to characteristics of the second class of device, such that the Bluetooth device performs sound output matching with characteristics of its device class.

The interaction between the Bluetooth headphone and the display apparatus in an embodiment of the present disclosure will be described below.

Figure 4:
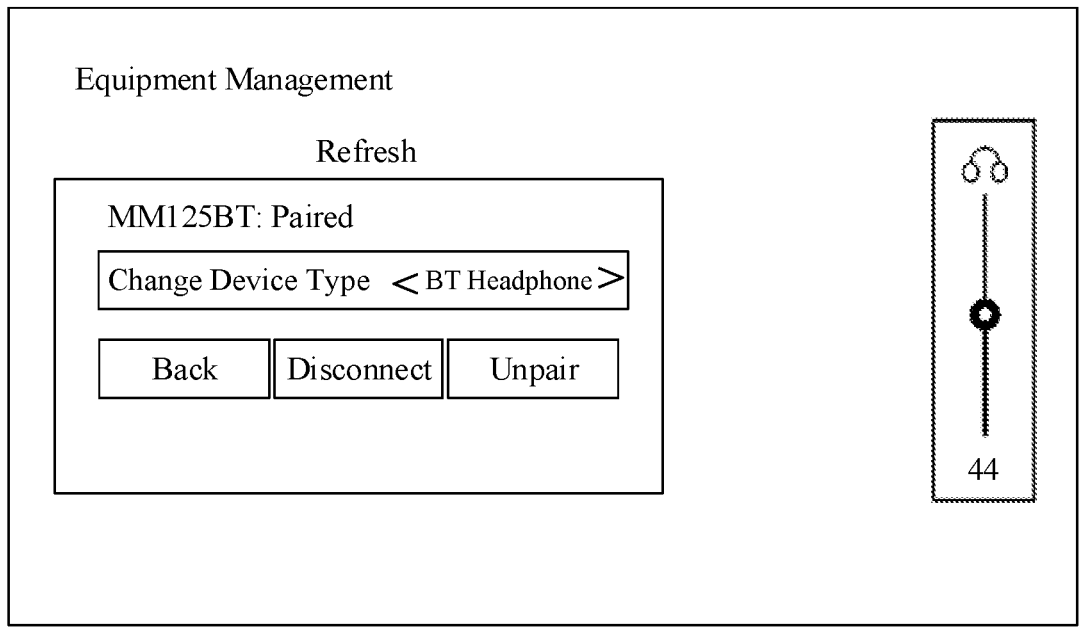
FIG. 4 is a schematic diagram of an interface presenting a class of Bluetooth device as a Bluetooth headphone according to an embodiment of the present disclosure.

As an embodiment, in a scenario where the second class of device is a class for indicating a BT headphone, the display apparatus will display an icon corresponding to the BT headphone at a specified position on a current interface. As shown in FIG. 4, a volume bar of the display apparatus is on a right side of an interface shown in FIG. 4, the volume bar is used for indicating volume of a sound output by the display apparatus, an icon is above the volume bar, and in this case, the icon is an icon corresponding to the second class of device, that is, the Bluetooth headphone.

Figure 5:
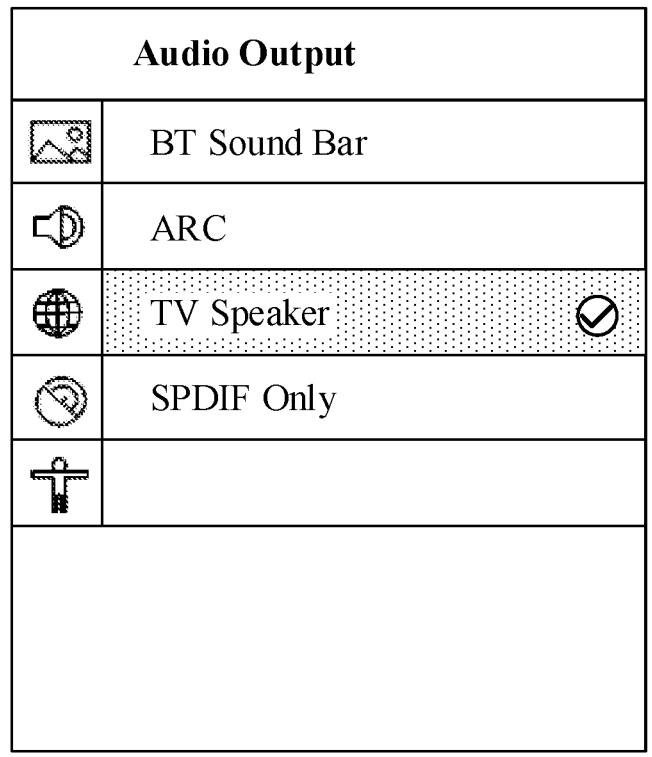
FIG. 5 is a schematic diagram of an Audio Output interface in a scenario where a class of Bluetooth device is a Bluetooth headphone according to an embodiment of the present disclosure.
Figures 6, 7:
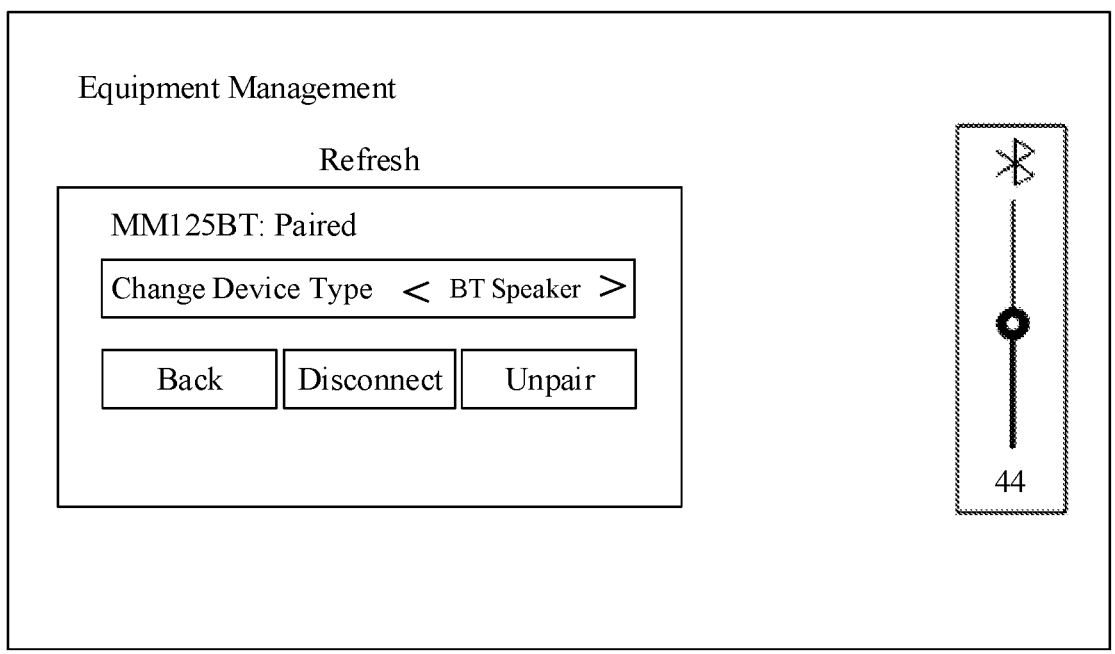
FIG. 6 is a schematic diagram of a Sound interface in a scenario where a class of Bluetooth device is a Bluetooth headphone according to an embodiment of the present disclosure.
FIG. 7 is a schematic diagram of an interface presenting a class of Bluetooth device as a Bluetooth speaker according to an embodiment of the present disclosure.

Moreover, as shown in FIG. 5, in the embodiment, it is identified that current audio is output by a configured TV speaker, then in a scenario where a mode on a headphone menu of a sound menu presented on the interface is headphone only, the headphone only (denoted as a first mode) being used for instructing the display apparatus to use a Bluetooth headphone, a TV Speaker is restrained from outputting sound in this mode, and the Bluetooth headphone is controlled to output sound. In a scenario where a mode on the headphone menu is headphone with speakers, the headphone with speakers (denoted as a second mode) being used for indicating use of a Bluetooth headphone and a TV Speaker, the Bluetooth headphone and the TV Speaker are controlled to output sound simultaneously. This is a Sound menu in a scenario where a class of Bluetooth device in the display apparatus is a Bluetooth headphone, and as shown in FIG. 6, the headphone menu is highlighted and can be adjusted on this interface.

In an embodiment of the present disclosure, it can be known that the first mode in the embodiment is used for instructing to prohibit the display apparatus from outputting sound by a speaker device used before the Bluetooth device is connected, and controlling the display apparatus to output sound by the Bluetooth headphone. The second mode is used for instructing the display apparatus to output sounds by the Bluetooth headphone and a speaker device used before the Bluetooth device is connected simultaneously.

The interaction between the Bluetooth headphone and the display apparatus is discussed, and the following is the interaction between the Bluetooth speaker and the display apparatus.

As an embodiment, in a scenario where the second class of device is a class for indicating a Bluetooth speaker, the display apparatus will display an icon corresponding to the BT Speaker at a specified position on a current interface. As shown in FIG. 7, a volume bar of the display apparatus is on a right side of an interface shown in FIG. 7, the volume bar is used for indicating volume of a sound output by the display apparatus, there is an icon above the volume bar, and in this case, the icon is an icon corresponding to the second class of device, that is, the Bluetooth speaker. Moreover, as shown in FIG. 8, a Headphone menu of a Sound menu presented on the interface of the display apparatus is grayed, meaning that the Headphone menu is not available for adjustment, and Dolby Atmos on the Sound menu is also grayed and not available for adjustment, wherein Dolby Atmos is a sound effect corresponding to the Bluetooth headphone.

In an embodiment of the present disclosure, as shown in FIG. 9, BT Sound bar in FIG. 9 is used for instructing the display apparatus to control the BT Speaker to output sound, and restrain other sound output devices other than the BT Speaker to output sound.

It should be noted that in this case, if options in FIG. 9 are adjusted to be other options other than the BT Sound bar, for example, adjusted to be TV Speaker, the display apparatus will output sound via a TV Speaker, and restrain a BT Speaker from outputting sound.

So far, the interaction between the Bluetooth device and the display apparatus in a scenario where the second class of device is the Bluetooth speaker is discussed.

Figure 10:
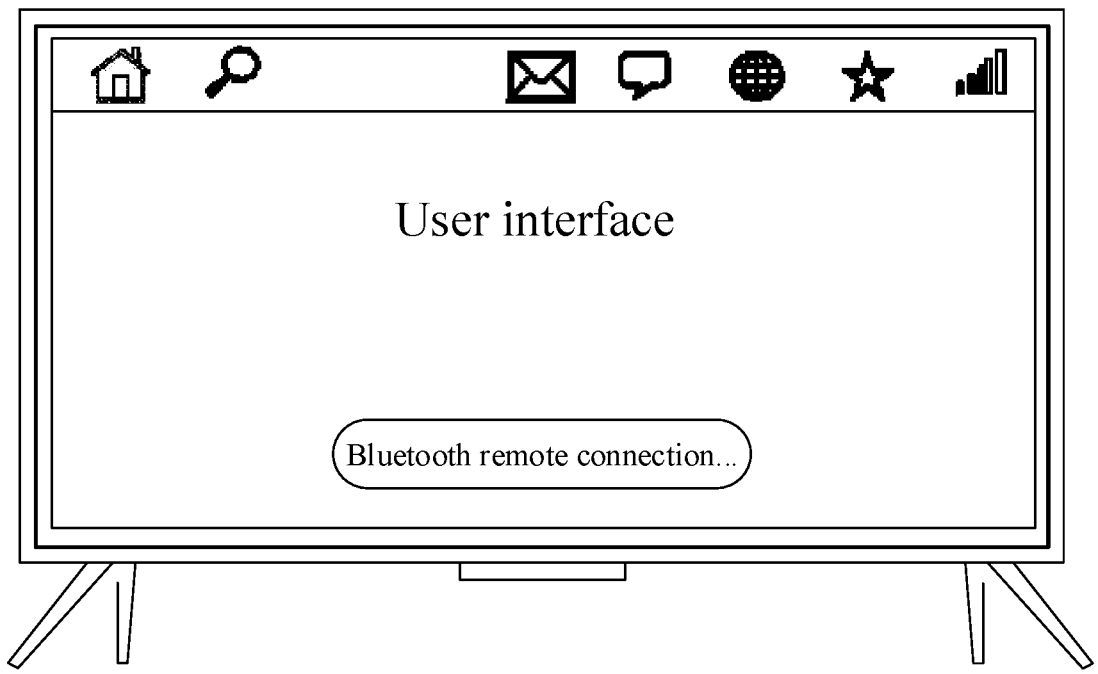
FIG. 10 shows a schematic diagram of a user interface for pairing a television with a Bluetooth remote control according to an embodiment of the present disclosure.

FIG. 10 shows a schematic diagram of a user interface for pairing a television with a Bluetooth remote control according to an embodiment of the present disclosure.

In some embodiments, a smart television receives a pairing instruction transmitted from an external Bluetooth remote control in a power up state, and the pairing instruction may be implemented by, for example, long pressing a MENU key of the remote control or long pressing a specific key.

It can be understood that under normal circumstances, a menu display function may be implemented on a user interface of a television by normally pressing the MENU key by a user, and if long pressing time exceeds a preset time threshold, for example, the time of long pressing the MENU key exceeds five seconds, an instruction transmitted from the remote control will be identified by the smart television as a pairing instruction for the remote control or an unpairing instruction for the remote control.

In some embodiments, when a user long presses the MENU key or a specific key on the remote control, after the smart television receives an instruction transmitted from the remote control, a current connection state between the smart television and the Bluetooth remote control is determined through monitoring of a broadcast packet of the remote control. If it is determined that the remote control and the smart television do not establish a pairing association, a pairing flow is triggered. If it is determined that the remote control is paired with the smart television, a flow for unpairing the remote control is triggered, and a specific logic thereof is as shown in FIG. 16.

Figure 16:
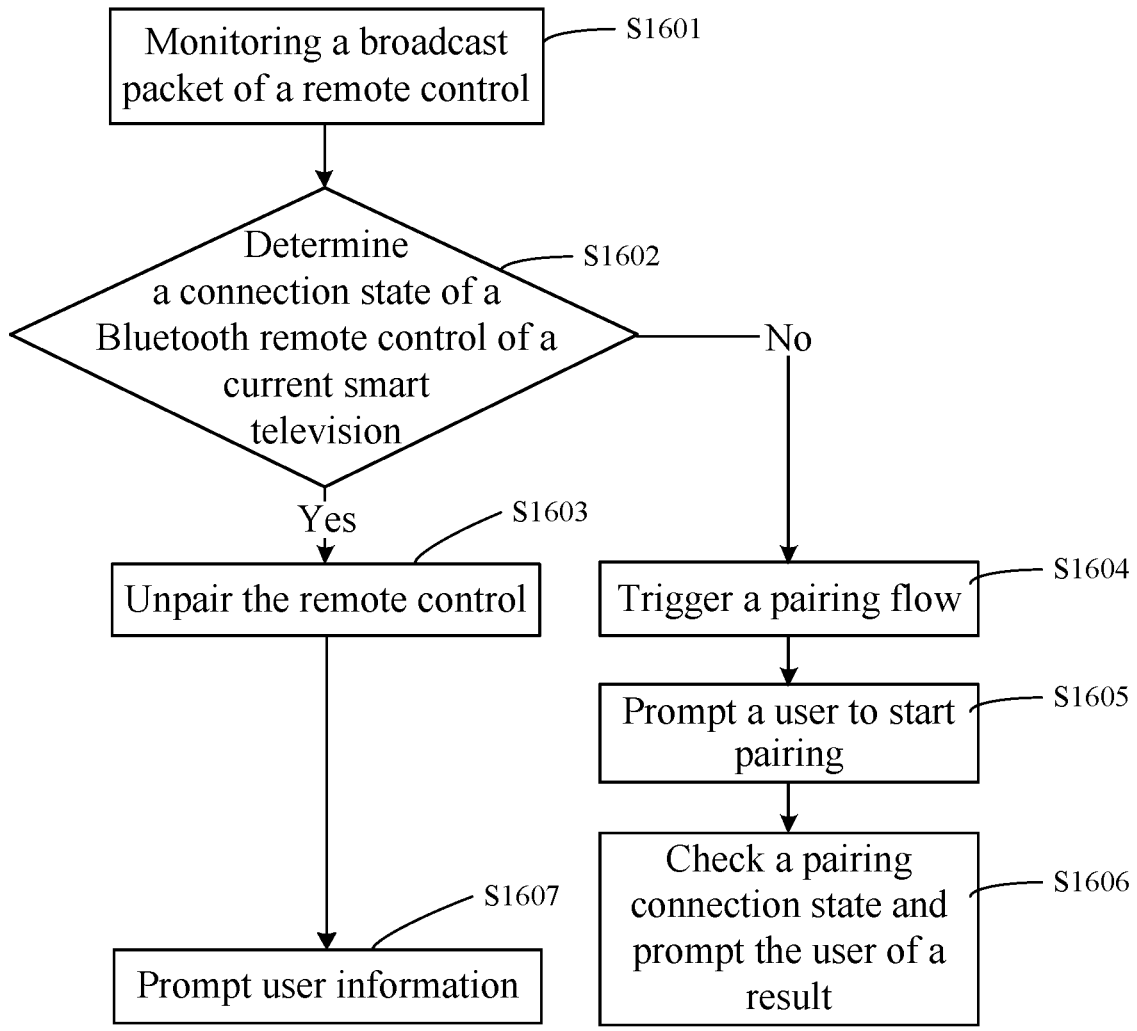
FIG. 16 shows a schematic logic diagram of pairing a Bluetooth remote control with a television according to an embodiment of the present disclosure.

As shown in FIG. 16, the following operations are included.

S1601, Monitoring a broadcast packet of a remote control.

S1602, Determine a connection state of a Bluetooth remote control of a current smart television. If it is determined that the remote control is paired with the smart television, the flow goes to S1603. If it is determined that the remote control and the smart television do not establish a pairing association, the flow goes to S1604.

S1603, Unpair the remote control.

S1604, Trigger a pairing flow.
S1605, Prompt a user to start pairing.
S1606, Check a pairing connection state and prompt the user of a result.
S1607, Prompt user information.

In some embodiments, when the smart television is not paired with the remote control, a first controller of the television will be automatically paired and connected with the external Bluetooth remote control according to the pairing instruction received without involving other operations of a user.

Figure 11:
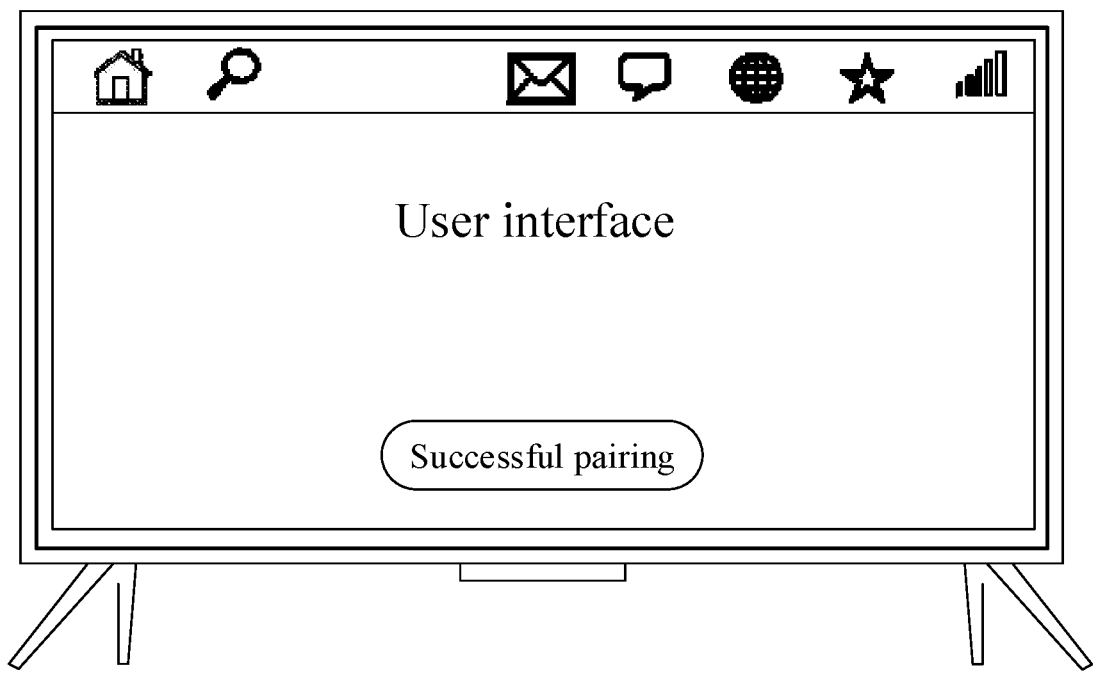
FIG. 11 shows a schematic diagram of a user interface for pairing a television with a Bluetooth remote control according to an embodiment of the present disclosure.

For example, on any user interface of the smart television, the user long presses a "Menu" key of a Bluetooth remote control, and then an alert message at a bottom of the user interface of the smart television may be presented. After receiving a message of long pressing "Menu" of the remote control, the smart television begins to perform connection and display the alert message of "Bluetooth remote connection". After the remote control is paired and connected with the smart television, a message for indicating "successful pairing" if pairing succeeds is presented as an alert for the user, which is as shown in FIG. 11, and a message for indicating "Bluetooth remote pairing failed" if pairing fails is presented as an alert for the user, which is as shown in FIG. 12.

Compared with a traditional pairing connection between an external device and a smart television, the scheme in the present disclosure completes all connection actions in background, and all operations may be completed in background only by a specific operation from a user. After the external Bluetooth remote control is paired with the smart television, the user interface of the television is controlled to present a message for indicating successful pairing, and a Bluetooth startup interface will not be presented any more. A user is not required to manually start Bluetooth or manually control to search nearby Bluetooth devices, not required to carry out selection and pairing operations on a plurality of searched Bluetooth devices, and not required to record and input adaptation codes. The user interface in a scenario where the Bluetooth remote control is paired is as shown in FIG. 11, and the user interface presents a simple alert message that "successful pairing".

In some embodiments, after the remote control is controlled by a user to transmit a pairing instruction, the first controller may control the user interface to present pairing connection information, for example, presenting an alert message for indicating "Bluetooth remote connection" as shown in FIG. 10, so as to alert the user that a smart television terminal begins to implement a command corresponding to a remote control pairing instruction issued from the user, thereby avoiding repeated operations. Before the message for indicating successful pairing shown in FIG. 11 is presented, the user is only required to wait all the time, and no other operation is required.

Figure 12:
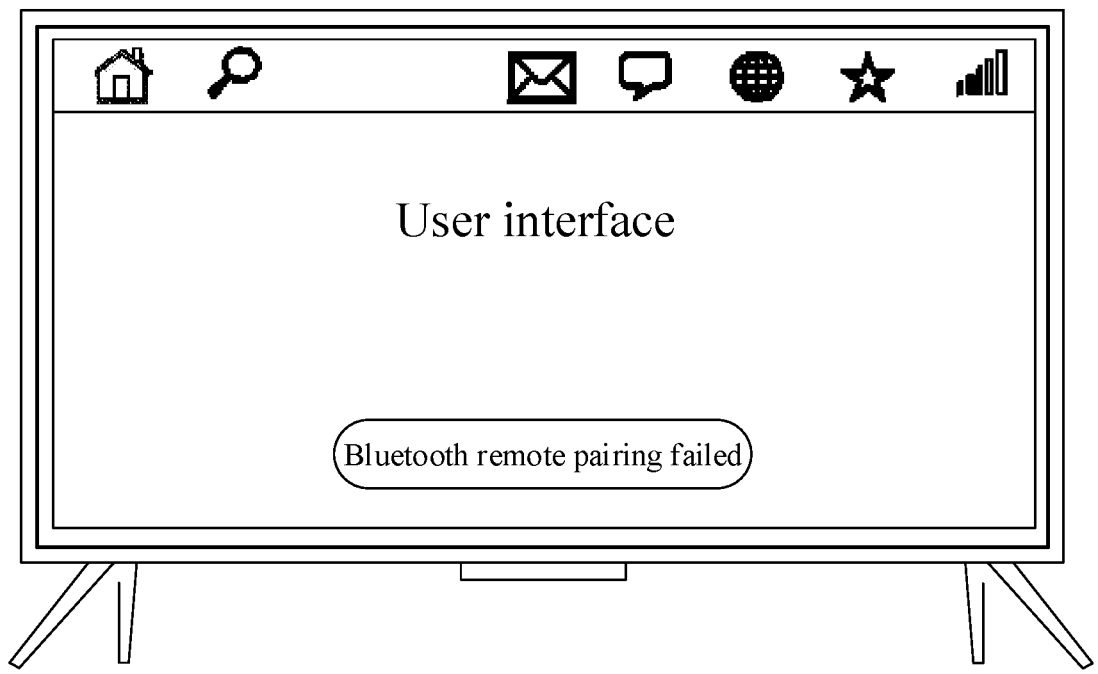
FIG. 12 shows a schematic diagram of a user interface for pairing a television with a Bluetooth remote control according to an embodiment of the present disclosure.

Similarly, when the Bluetooth remote control is not paired with the smart television, the first controller will control the user interface to display a message for indicating pairing failure, for example, a message for indicating "Bluetooth remote pairing failed", which is illustrated in FIG. 12.

In some embodiments, after the Bluetooth remote control is paired with the smart television, an unpairing instruction is generated by long pressing a MENU key, and the smart television receives the unpairing instruction from the Bluetooth remote control, the first controller controls the smart television to automatically unpair a paired Bluetooth remote control on the basis of the unpairing instruction without other operations from the user.

After the Bluetooth remote control is unpaired with the smart television, the first controller will control the user interface to present a message for indicating unpairing. As shown in FIG. 12, the alert message may be displayed as, for example, "Bluetooth remote pairing failure". In an unpairing process of the Bluetooth remote control, the user interface does not have other presentation space required for operations and interactions from a user, so as to reduce operation inconvenience of the user, make a pairing and unpairing operation interface for a remote control simpler, and improve convenience of pairing and unpairing operations.

Figure 13:
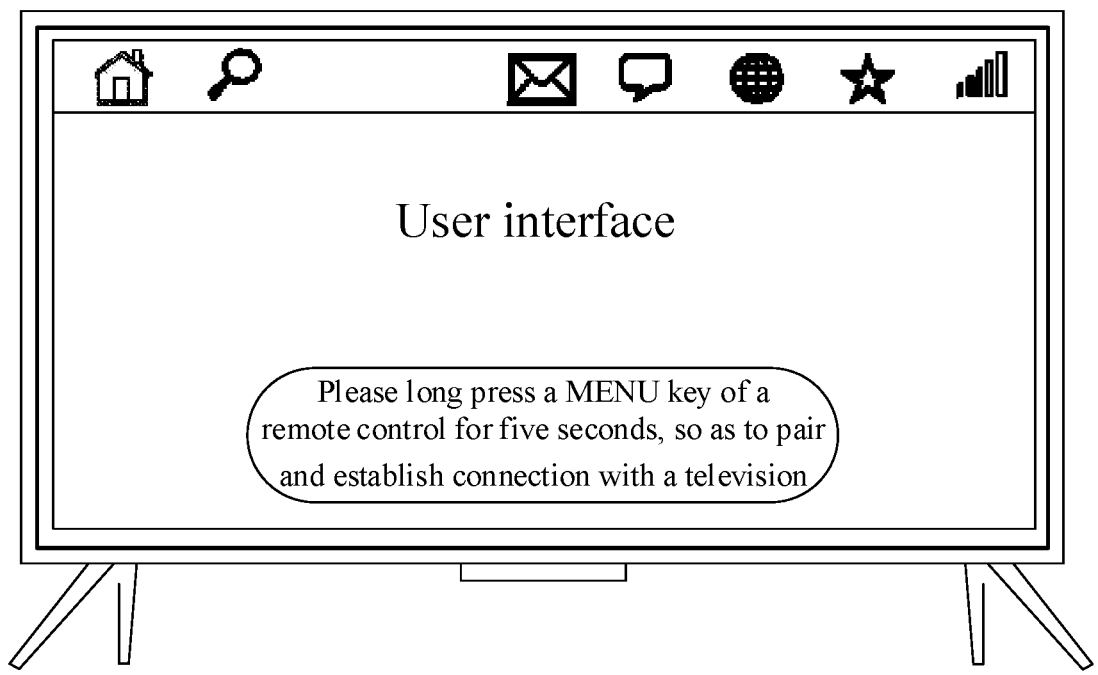
FIG. 13 shows a schematic diagram of a user interface for pairing a television with a Bluetooth remote control according to an embodiment of the present disclosure.

FIG. 13 shows a schematic diagram of a user interface for pairing a television with a Bluetooth remote control according to another embodiment of the present disclosure.

In some embodiments, the remote control may be configured to support both Bluetooth and infrared functions. Conventional channel switch, volume adjustment and other functions may be implemented through controlling a speed and a distance of the infrared function of the remote control. However, the remote control operates the smart television by means of voice instructions, and a data volume is increased, such that a Bluetooth function of the remote control having a higher transmission rate, faster response and longer control distance is required for implementation.

If the infrared connection of the remote control has been established but the Bluetooth connection has not been established, the user issues a command that may be implemented only through Bluetooth transmission to the television by mean of the remote control. The first controller of the television receives the command from the remote control, and controls, according to the command, the user interface to display a prompt message for prompting to issue a pairing instruction method for the user, so as to help the user to pair a Bluetooth system of the remote control with the smart television.

The command is implemented as pressing a voice key and may be used for issuing a voice command to control the television to search programs. The command transmitted upon press of the voice key on the remote control may include a triggering effect and a function application. Before the Bluetooth system of the remote control is paired with the smart television, the voice key is used for enabling the first controller to implement a voice key trigger effect, that is, displaying a prompt message for helping the user to pair the Bluetooth system of the remote control with the television. After the Bluetooth system of the remote control is paired with the smart television, the command transmitted upon press of the voice key on the remote control is used for causing the first controller of the television to implement a voice instruction function corresponding to the voice key.

For example, in a scenario where the Bluetooth system of the remote control has not established connection with the television, the user presses a "Voice" key on the remote control, and the smart television detects that the remote control has not established connection and control the user interface to display a prompt message that "please long press a Menu key of the remote control for five seconds, so as to pair and establish connection with the television", which is as shown in FIG. 13.

In some embodiments, the remote control has dual modes, i.e., infrared and Bluetooth modes, so as to guarantee that the remote control may be used in any situation. The user long presses a "Menu" key in any user interface to transmit a broadcast packet to the smart television, so as to trigger pairing and unpairing flows. After the smart television receives a pairing broadcast packet, the first controller will determine a communication state between the smart television and the remote control. In a scenario where the remote control has established connection with the display apparatus, the first controller will start a Bluetooth remote control unpairing flow. In a scenario where the remote control has not established connection with the display apparatus, the first controller will start a Bluetooth remote control pairing connection flow. After a pairing state of the Bluetooth remote control changes, the user interface will immediately display a connection state change prompt of the Bluetooth remote control for the user.

It can be understood that an extremely simplified pairing connection operation of the Bluetooth remote control may be implemented through the above embodiments. On any interface, the user is only required to long press a specific key to trigger rapid pairing and unpairing of the Bluetooth remote control, and the smart television will automatically start specific pairing, unpairing and other flows according to a connection state of a current Bluetooth peripheral, and meanwhile, display pairing and unpairing results to the user in real time. This method not only is convenient, simple and efficient, but also may enhance intellectualization of a product and improve interactive experience of the product, thereby improving competitiveness of the product.

Figure 14:
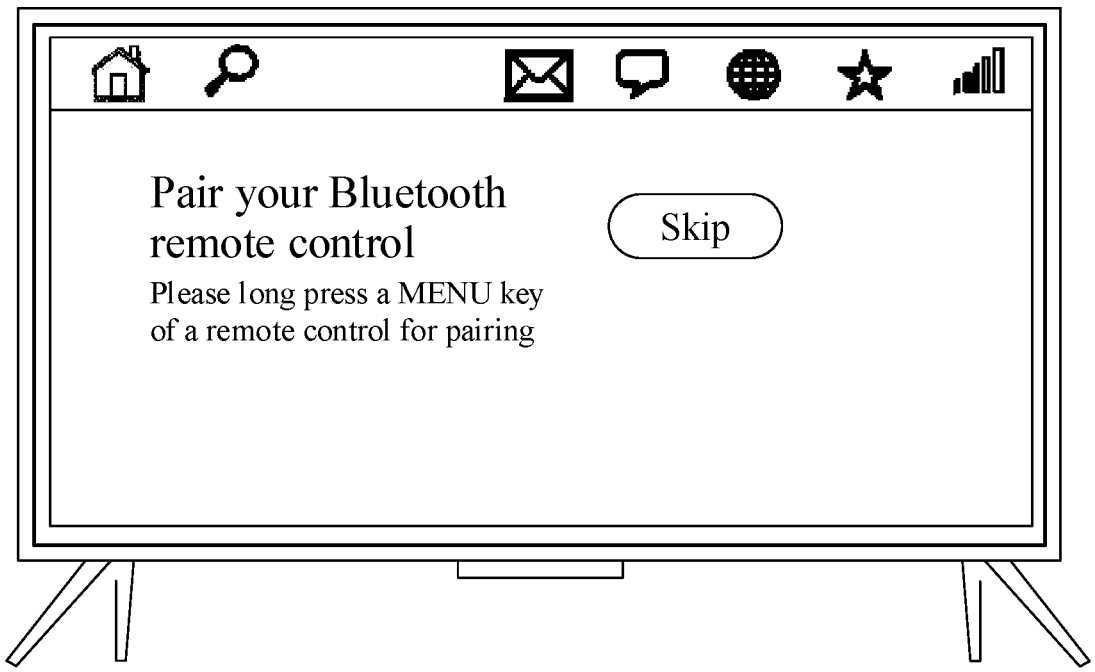
FIG. 14 shows a schematic diagram of a user interface for pairing a television with a Bluetooth remote control according to an embodiment of the present disclosure.

FIG. 14 shows a schematic diagram of a user interface for pairing a television with a Bluetooth remote control according to another embodiment of the present disclosure.

In some embodiments, the display apparatus in the embodiments further provides a navigation function for rapidly pairing with an external device, and the first controller controls the user interface to display a navigation interface for pairing the external device with the display apparatus, which is as shown in FIG. 14. The simple user interface prompts the user to implement remote control pairing by long pressing the MENU key of the remote control, and the navigation interface further includes a control that can change presentation style. If skip control is presented, it means that after the user clicks a "skip" button, the smart television will skip a Bluetooth remote control pairing flow, and a logic diagram thereof is as shown in FIG. 17.

Figure 17:
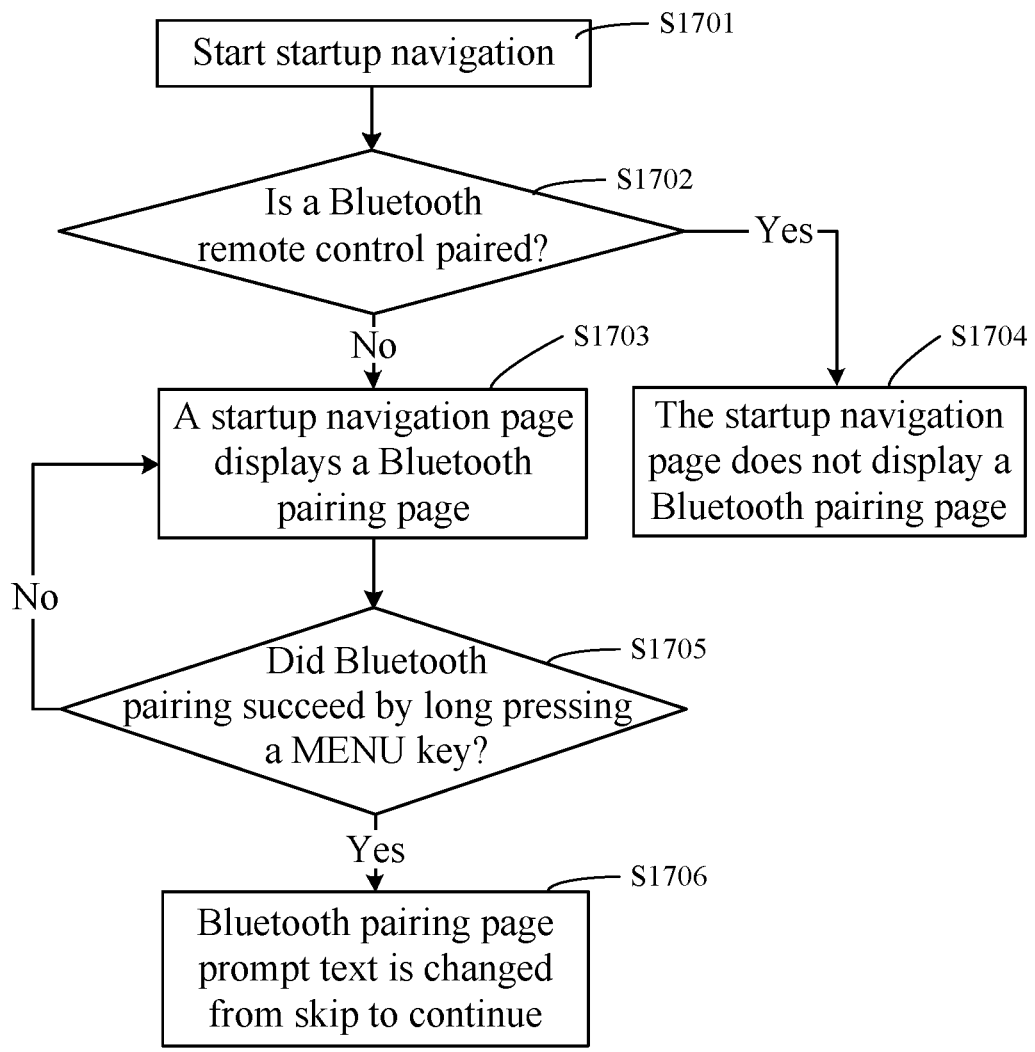
FIG. 17 shows a schematic logic diagram of navigation pairing of a Bluetooth remote control according to an embodiment of the present disclosure.

As shown in FIG. 17, the following operations are included.

S1701, Start startup navigation.

S1702, Is a Bluetooth remote control paired? If the Bluetooth remote control is paired, the flow goes to S1704. If the Bluetooth remote control is not paired, the flow goes to S1703.

S1703, A startup navigation page displays a Bluetooth pairing page.

S1704, The startup navigation page does not display a Bluetooth pairing page.

S1705, Did Bluetooth pairing succeed by long pressing a MENU key? If Bluetooth pairing succeeded by long pressing the MENU key, the flow goes to S1706. If Bluetooth pairing did not succeed by long pressing the MENU key, the flow returns to S1703.

S1706, Bluetooth pairing page prompt text is changed from skip to continue.

For example, after the smart television is used for the first time or reset, the user interface will display the navigation interface as shown in FIG. 14. Through the navigation interface shown in the figure, the user is prompted to pair the Bluetooth remote control and a specific pairing method is displayed. The user may click "skip" to ignore Bluetooth remote control pairing. After the user successfully pairs the Bluetooth remote control according to the prompt, and the first controller monitors, by page event listener, that the remote control has established connection, the "skip" button on the user interface will automatically update with a "continue" button.

Figure 15:
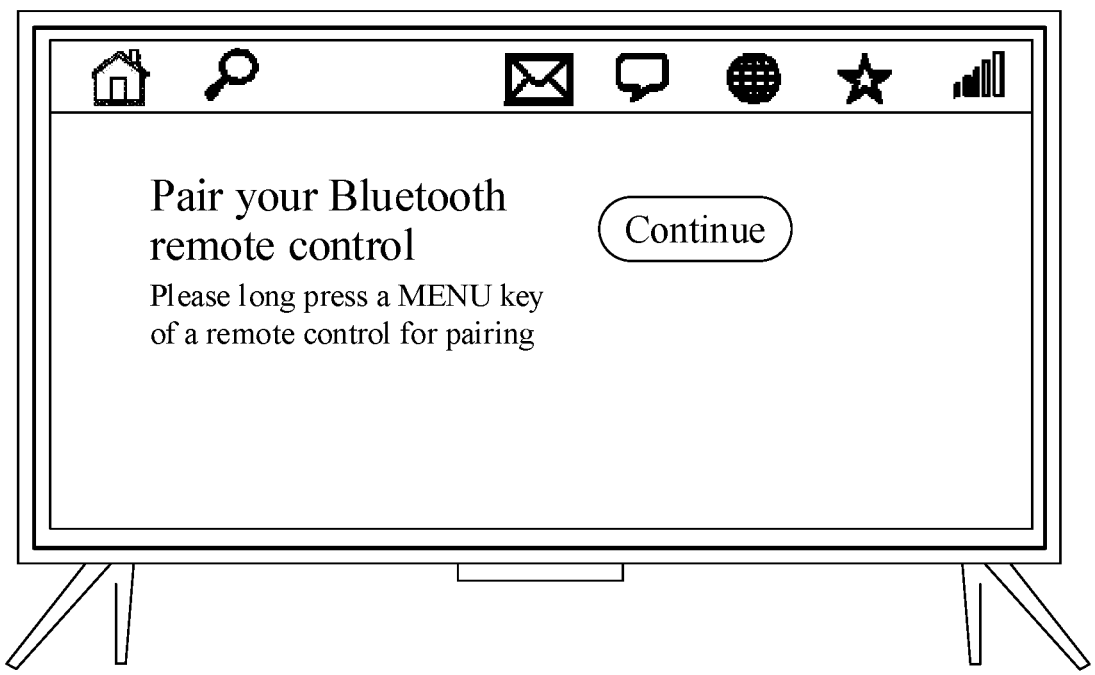
FIG. 15 shows a schematic diagram of a user interface for pairing a television with a Bluetooth remote control according to an embodiment of the present disclosure.

It can be understood that before the external device is successfully paired, a control on the user interface is displayed as a first button for cancelling a pairing operation. After the external device is successfully paired, the control is displayed as a second button for skipping to other function configuration interfaces, for example, presented as the "Continue" button, which is as shown in FIG. 15.

Through this method, a user may rapidly and conveniently pair and unpair the Bluetooth remote control, an intuitive state prompt is given to a user, and complicated connection operations are not required. Moreover, when the Bluetooth key on the remote control is used, a specific operation method will be provided for the user such that the user may conveniently and rapidly use the Bluetooth remote control, thereby improving the experience of the user.

The present disclosure further provides a control method for rapidly pairing an external device. The method includes: receive a pairing command from an external device, the pairing command is configured for automatically pairing and connecting the external device without involving other operations from a user; and display a message for indicating successful pairing after the external device is paired with the display apparatus, and display a message for indicating ongoing pairing connection before presenting the message for indicating successful pairing. The specific steps of a control method for rapidly pairing an external device with the display apparatus are described above, and will omit herein.

In some embodiments, after the external device is paired with the display apparatus, the method further includes: receive an unpairing command from an external device, where the unpairing command is configured for automatically unpairing the paired external device without involving other operations from a user; and display a message for indicating unpairing after the external device is unpaired with the display apparatus.

In some embodiments, before a pairing command from the external device is received, the method further includes: receive a command from the external device; and display a prompt message for prompting a user to issue a pairing method. The command includes a trigger effect and a function application; before the external device is paired, the command is used for implementing the trigger effect, so as to display the prompt message; and after the external device is paired, the command is used for implementing a corresponding function application. The specific steps of the control method for rapidly pairing an external device are described above, and will omit herein.

In some embodiments, the pairing command from the external device is implemented by long pressing a specific key by a user. The specific steps of the control method for rapidly pairing an external device are described above, and will omit herein.

In some embodiments, before the pairing command from the external device is received, the method further includes: display a navigation interface for pairing an external device, the navigation interface including a control that is able to change presentation. Before the external device is successfully paired, the control is displayed as a first button for cancelling the pairing operation; and after the external device is successfully paired, the control is displayed as a second button for skipping to other function configuration interfaces. The specific steps of the control method for rapidly pairing an external device are described above, and will omit herein.

The embodiments of the present disclosure have the benefits that by establishing pairing and unpairing commands, the display apparatus may automatically identify, pair and unpair a current external device. Further, through an automatic configuration process, the user's operation may be simplified. Further, by presenting a message for indicating successful pairing and a message for indicating ongoing pairing connection, the user interface may be simplified, the external device may be rapidly paired, pairing operation inconvenience may be reduced, pairing intellectualization and automation may be achieved, and cumbersome pairing process operations may be avoided.

The above are merely embodiments of the present disclosure, but not intended to limit the present disclosure, and any modifications, equivalents, improvements, etc. made within the spirit and principles of the present disclosure shall fall within the scope of protection of the present disclosure.

What is claimed is:

1. A display apparatus, comprising:
   a display, configured for presenting one or more images obtained from a broadcast system and/or network, and/or, a user interface, and capable of communicating with a remote control according to infrared protocols or Bluetooth protocols, wherein the remote control comprises one or more keys;
   a communicator, configured for communicating with one or more external devices according to Bluetooth protocols; and
   a controller, in connection with the display and the communicator, and configured to:
   recognize a first class of device of a Bluetooth device currently in connection with the display apparatus, and present the first class of device in a first user interface of the display;
   in response to a device switch command being received within a specified time from outside, determine that the first class of device is different from an actual second class of device of the Bluetooth device currently in connection with the display apparatus, update the first class of device in the first user interface of the display to the second class of device, and interact with the Bluetooth device according to the second class of device, wherein the device switch command is generated in a scenario where the first class of device is different from the actual second class of device of the Bluetooth device currently in connection with the display apparatus; and
   in response to no device switch command being received within the specified time from outside, determine that the first class of device Is the same as the actual second class of device, and interact with the Bluetooth device according to the second class of device,
   wherein the first class of device is configured for indicating a Bluetooth headphone, and the controller is further configured to:
   present an icon corresponding to the Bluetooth headphone at a specified position on the first user interface; and
   in response to that current audio of the display apparatus being configured to output via a speaker in the display apparatus and a mode on a headphone menu of a sound menu being a first mode for indicating the Bluetooth headphone for sound output in the display apparatus, restrain the speaker from outputting sound, and control the Bluetooth headphone to output sound; and in response to that current audio of the display apparatus being configured to output via a speaker in the display apparatus and a mode on a headphone menu of a sound menu being a second mode for indicating the Bluetooth headphone and the speaker for sound output in the display apparatus, control the Bluetooth headphone and the speaker to output sound simultaneously.

2. The display apparatus according to claim 1, wherein the controller is configured to: in response to a command for indicating that the first class of device being consistent with the second class of device from outside, determine that the first class of device is the same as the second class of device, and interact with the Bluetooth device according to the actual second class of device.

3. The display apparatus according to claim 1, wherein the first class of device is configured for indicating a Bluetooth headphone, and the second class of device is configured for indicating a Bluetooth speaker.

4. The display apparatus according to claim 3, wherein the controller is further configured to:
   control the Bluetooth speaker to output sound for the display apparatus, and restrain other sound output devices other than the Bluetooth speaker from outputting sound.

5. The display apparatus according to claim 3, wherein the controller is further configured to:
   present an icon corresponding to the Bluetooth speaker at a specified position on the second user interface, and disable adjustment of a headphone menu of a sound menu presented on the second user interface.

6. The display apparatus according to claim 1, wherein the controller is further configured to:
   obtain a Class Of Device (COD), written into the Bluetooth device during communication with the Bluetooth device, wherein the COD is configured for indicating a class of the Bluetooth device; and
   determine at least one of a major device class or a minor device class indicated by the COD as the first class of device.

7. The display apparatus according to claim 1, wherein the one or more external devices comprises the remote control which is able to communicate according to Bluetooth protocols, and the controller is further configured to:
   receive an instruction for indicating Bluetooth associated operation from the remote control which is able to communicate according to Bluetooth protocols, wherein the instruction for indicating Bluetooth associated operation is generated by pressing a key on the remote control for a preset time period from a user; and
   in response to the instruction for indicating Bluetooth associated operation, start a flow for the Bluetooth associated operation without further operation from the user.

8. The display apparatus according to claim 7, wherein the controller is further configured to:
   determine a current communication state between the display apparatus and the remote control by monitoring a broadcast packet from the remote control;
   in response to the remote control and the display apparatus having not established a Bluetooth pairing communication, start a first flow for establishing Bluetooth pairing with the remote control without further operation from the user; and
   in response to the remote control having established a Bluetooth pairing communication, start a second flow for unpairing with the remote control without further operation from the user.

9. The display apparatus according to claim 8, wherein the controller is further configured to:
   upon end of the first flow, cause the display to present an alert for indicating Bluetooth state change of the remote control.

10. A device switching method for a display apparatus, comprising:
   recognizing a first class of device of a Bluetooth device currently in connection with the display apparatus, wherein the display apparatus comprises a communicator configured for communicating with one or more external devices according to Bluetooth protocols;
   presenting the first class of device in a first user interface of a display of the display apparatus;
   in response to a device switch command being received within a specified time from outside, determining that the first class of device is different from an actual second class of device of the Bluetooth device currently in connection with the display apparatus, updating the first class of device in the first user interface of the display to the second class of device, and interacting with the Bluetooth device according to the second class of device, wherein the device switch command is generated in a scenario where the first class of device is different from the actual second class of device of the Bluetooth device currently in connection with the display apparatus; and
   in response to no device switch command being received within the specified time input from outside, determining that the first class of device is the same as the actual second class of device, and interacting with the Bluetooth device according to the second class of device-,
   wherein the first class of device is configured for indicating a Bluetooth headphone; and the method further comprises:
   presenting an icon corresponding to the Bluetooth headphone at a specified position on the first user interface; and
   in response to that current audio of the display apparatus being configured to output via a speaker in the display apparatus and a mode on a headphone menu of a sound menu being a first mode for indicating the Bluetooth headphone for sound output in the display apparatus, restraining the speaker from outputting sound and controlling the Bluetooth headphone to output sound; and
   in response to that current audio of the display apparatus being configured to output via a speaker in the display apparatus and a mode on a headphone menu of a sound menu being a second mode for indicating the Bluetooth headphone and the speaker for sound output in the display apparatus, controlling the Bluetooth headphone and the speaker to output sound simultaneously.

11. The method according to claim 10, further comprising:
   in response to a command for indicating that the first class of device being consistent with the second class of device from outside, determining that the first class of device is the same as the second class of device, and interacting with the Bluetooth device according to the actual second class of device.

12. The method according to claim 10, wherein the first class of device is configured for indicating a Bluetooth headphone, and the second class of device is configured for indicating a Bluetooth speaker.

13. The method according to claim 12, further comprising:
   controlling the Bluetooth speaker to output sound for the display apparatus, and restraining other sound output devices other than the Bluetooth speaker from outputting sound.

14. The method according to claim 12, further comprising:
   presenting an icon corresponding to the Bluetooth speaker at a specified position on the second user interface, and disabling adjustment of a headphone menu of a sound menu presented on the second user interface.

15. The method according to claim 10, further comprising:
   obtaining a Class Of Device (COD), written into the Bluetooth device during communication with the Bluetooth device, wherein the COD is configured for indicating a class of the Bluetooth device; and
   determining at least one of a major device class or a minor device class indicated by the COD as the first class of device.

16. The method according to claim 10, further comprising:
   receiving an instruction for indicating Bluetooth associated operation from a remote control which is able to communicate according to Bluetooth protocols, wherein the instruction for indicating Bluetooth associated operation is generated by pressing a key on the remote control for a preset time period from a user; and
   in response to the instruction for indicating Bluetooth associated operation, start a flow for the Bluetooth associated operation without further operation from the user.

17. The method according to claim 16, further comprising:
   determining a current communication state between the display apparatus and the remote control by monitoring a broadcast packet from the remote control;
   in response to the remote control and the display apparatus having not established a Bluetooth pairing communication, starting a first flow for establishing Bluetooth pairing with the
   remote control without further operation from the user; and
   in response to the remote control having established a Bluetooth pairing communication, starting a second flow for unpairing with the remote control without further operation from the user.

18. The method according to claim 17, further comprising:
   upon end of the first flow, causing the display to present an alert for indicating Bluetooth state change of the remote control.

* * * * *